June 2, 1931.                J. SHORT                1,807,798
COUPLING

Filed March 23, 1925

WITNESS

IRA SHORT
INVENTOR

BY
ATTORNEY

Patented June 2, 1931

1,807,798

UNITED STATES PATENT OFFICE

IRA SHORT, OF ESSINGTON, PENNSYLVANIA, ASSIGNOR TO WESTINGHOUSE ELECTRIC & MANUFACTURING COMPANY, A CORPORATION OF PENNSYLVANIA

COUPLING

Application filed March 23, 1925. Serial No. 17,712.

My invention relates to couplings, particularly to shaft couplings of the flexible type and it has for an object to provide apparatus of the character designated which shall be capable of transmitting rotary motion from one shaft section to an adjacent shaft section and which shall possess a high degree of torsional flexibility, as well as effectively damping torsional vibrations which may be set up in either of the shaft sections.

Figure 1:
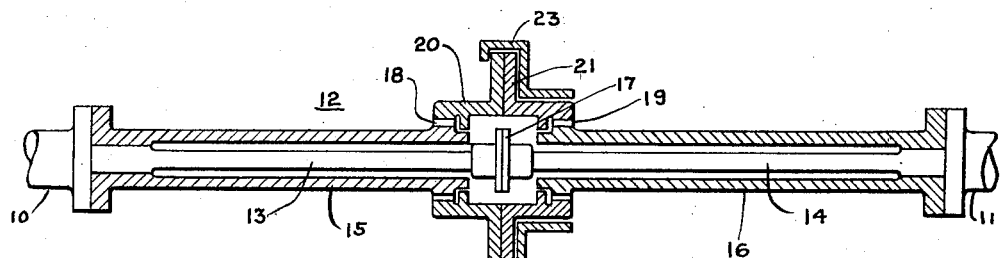
Figure 2:
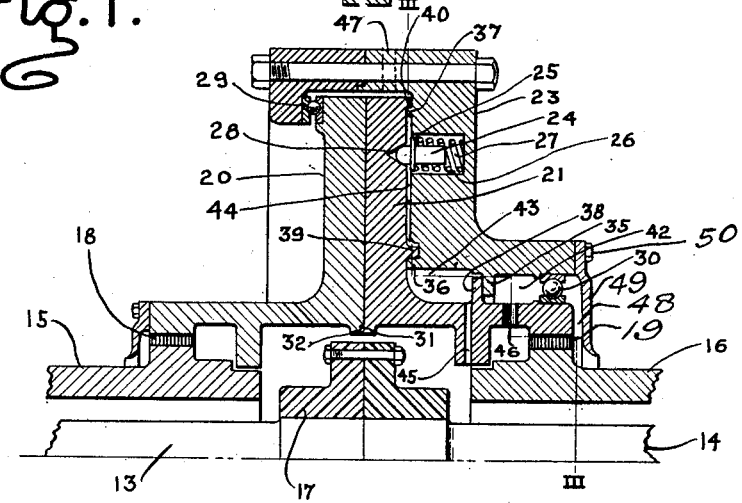
Figure 3:
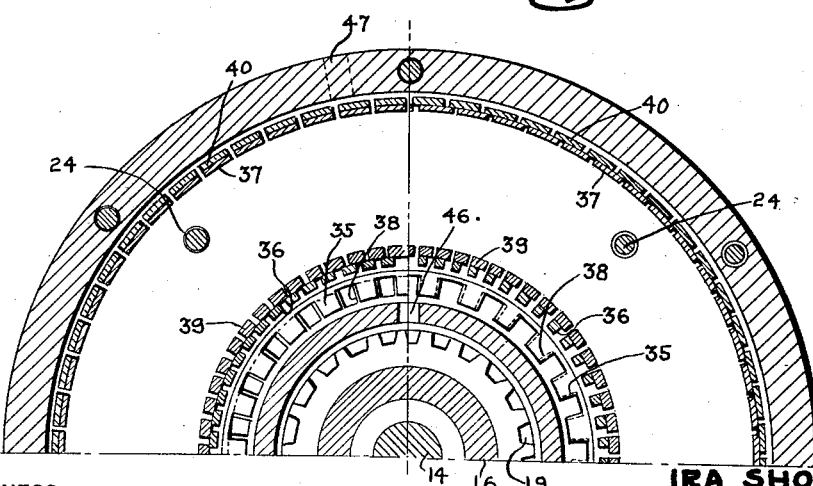

These and other objects, which will be made apparent throughout the further description of my invention, may be attained by the employment of the apparatus hereinafter described and illustrated in the accompanying drawings in which Fig. 1 is a view, in sectional elevation, of one form of my coupling; Fig. 2 is a partial view, in sectional elevation, which shows, to an enlarged scale, the intermediate portion of the coupling illustrated in Fig. 1, and Fig. 3 is a transverse sectional elevation taken on the line III—III of Fig. 2, the left-hand portion of this view illustrating the appearance of the coupling when transmitting a uniform torque and the right-hand portion of this view illustrating the appearance of the coupling when damping vibration.

Couplings for flexibly connecting adjacent shaft sections which include facilities for damping torsional vibration are generally constructed in such a manner that the damping force must be partially overcome in order that the flexible portion of the coupling may respond to pulsations in the torque. Such a condition is rather undesirable, inasmuch as the damping mechanism impairs the torsional flexible qualities of the coupling.

I have, therefore, provided a form of coupling which is extremely flexible torsionally and in which the damping means remain normally inactive until such time as the flexible movements of the coupling require some absorbing or restraining influence whereupon, the coupling having flexed, the damping mechanism gradually dissipates the accumulated energy without shock or impact. My coupling is so designed that the reflexive or reactive movements of the coupling are effectively damped, thereby avoiding any tendency for the coupling and shafting to oscillate torsionally.

Referring to the drawings for a more detailed description of my invention, I show in Fig. 1 shaft sections 10 and 11 connected by my improved type of coupling 12. The coupling 12 comprises flexible torque transmitting members 13 and 14 and rigid torque transmitting members 15 and 16, one flexible and one rigid member being secured to each shaft section. The flexible members 13 and 14 are connected by a coupling 17 which is of the rigid type. Provided in the outer periphery of the adjacent ends of the rigid members 15 and 16, are spur gear teeth 18 and 19 which mesh with similar teeth provided respectively on flanges 20 and 21. The teeth provided between the rigid members and the flanges are so arranged as to permit of relative angular displacement of the rigid members 15 and 16 in a manner well known in the art. It is to be understood that my invention is not solely confined to the use of gear teeth but that I may employ any of the numerous types of connecting means which are well known in the flexible coupling art.

The adjacent surfaces of the flanges 20 and 21 are maintained in engagement by a clamp member 23 of considerable mass. As shown in Fig. 2, the clamp member 23 is provided with a plurality of pins 24 each having a shoulder portion 25 and disposed within suitable recesses 26 in the clamp. Interposed between each shoulder portion 25 and the base of each recess 26 is a spring 27 installed under an initial compression for maintaining the pin 24 in contact or engagement with a conical recess 28 provided in the flange 21. The clamp 23 also engages the flanges 20 and 21 through ball bearings 29 and 30, the arrangement being such that the two flange members are free to rotate relative to the clamp member and to each other, except for the restraining influence exerted by the pins 24. The springs 27 are relatively weak, providing a light force tending to keep the clamp 23 in position relative to flange 21. The springs will yield, however, to a substantial force tending to rotate flange 21 relative to clamp 23. Interfitting male and female portions 31 and 32 are provided respectively in the flanges 21 and 20 for maintaining them in axial alignment.

Provided on the inner face of the clamp member 23 are three concentrically arranged series of projecting elements 35, 36 and 37, which, as shown in Fig. 3, engage or cooperate with similar projecting elements 38, 39 and 40 provided on the adjacent face of the flange 21. Relative rotational movements of the projecting elements provided on the flange and on the clamp control the flow of the damping fluid. The three series of projecting elements define three annular chambers 42, 43 and 44 for the passage of the damping fluid. An air vent 45 is provided in the chamber 43 and a passage 46 communicates with the chamber 42 for permitting a portion of the damping fluid to be utilized as a lubricant in the gear teeth, should it be found advisable. A passage 47 is provided in the clamp 23 for the discharge of damping fluid from the coupling.

The operation of the above embodiment is as follows: Assuming the coupling 12 to be transmitting a uniform torque from the shaft 11 to the shaft 10, the load is conveyed by the flexible members 13 and 14. Relative angular displacement of the shaft sections 10 and 11 may take place by the required displacement of the rigid members 15 and 16 and their respective flanges 20 and 21 and by the necessary twisting of the torque transmitting members 13 and 14. As the clamp 23 is normally secured to the flange 21 by the pins 24, the relative angular positions of the projecting elements 35 and 38, 36 and 39, and 37 and 40 are as indicated in the left-hand portion of Fig. 3. A suitable damping fluid, such as oil, may be continuously supplied to the annular chamber 42 through passage 48 formed between members 16 and 21 and retaining ring 49 bolted to clamp 23 at 50. Because of the position of the elements 35 and 38, as illustrated in the left-hand portion of Fig. 3, the damping fluid is permitted to flow into the chamber 43 and be retained therein, as the elements 36 and 39 are in what may be termed a closed position. Any damping fluid which may leak into the chamber 44 is thrown outwardly through the passage 47 as the elements 37 and 40 remain normally in an open position.

Should the speed of the shaft section 11 be momentarily increased or decreased, the torque transmitting members 13 and 14 flex torsionally and the flange 21 is displaced or rotates with respect to the flange 20 and also the clamp member 23, the inertia of the latter being sufficient to overcome the holding action of pins 24 and springs 27. The pins 24 are incidentally displaced from their conical recesses 28 and the three series of projecting elements assume the relative positions indicated in the right-hand portion of Fig. 3. As the elements 35 and 38 have now assumed a closed position and the elements 36 and 39 an open position, the damping fluid contained in the chamber 43 moves radially outward into the chamber 44 wherein it is retained by the closed position of the elements 37 and 40. The action of centrifugal force generates a considerable pressure, which pressure acts upon the adjacent faces of the flange 21 and the clamp 23, while the accumulated energy resulting from the sudden change in the speed of the shaft section 11 is absorbed by the flexible members 13 and 14. As flange 20 is held on the opposite side by clamp 23, the pressure against flange 21 will force it against flange 20, and the flanges 20 and 21 will be held together against relative rotation by a force equal to the pressure of the damping fluid. The flanges 20 and 21, together with their respective torque transmitting members 15 and 16, and the flexible torque transmitting members 13 and 14 are therefore momentarily retained in their displaced or flexed positions by the fluid pressure, thereby avoiding any torsional oscillation as may be caused by a tendency of the torque transmitting members to unwind or freely return to their normal operating positions. The projecting elements 37 and 40 are so fitted that when disposed in a closed position, a slight amount of damping fluid is continuously permitted to leak out of the chamber 44 and to be discharged through the passage 47. The hydraulic pressure within the chamber 44 and the clamping action on flanges 20 and 21 are therefore slowly reduced and the accumulated energy gradually dissipated, permitting the flanges 20 and 21 to ultimately resume their normal relative positions. The flange 21 will also return to its original position with respect to clamp 23, which, because of its inertia, rotates at substantially uniform speed. The pins 24 will slip into their respective recesses, insuring accurate return of the relative position of flange 21 and clamp 23. The rigid torque transmitting members 14 and 15 may then relax completely.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a coupling for transmitting torque, the combination of a torsionally flexible member for connecting adjacent shaft sections, a rigid member secured to each section, a flange flexibly connected to each rigid member, clamping means for holding the flanges in sufficient frictional engagement to prevent relative rotational movement during the transmission of a uniform torque but ineffective to prevent such movement upon a pulsation in the torque, means operated by a relative movement of the flanges for permitting fluid under pressure to supplement the holding action of the clamping means, and means for subsequently dissipating the fluid pressure in such manner as to damp the reflexive movement of the flexible member and the return of the rigid members to their normal relative positions.

2. In a power-transmission coupling, the combination of a driving member, a driven member, a torsionally flexible member connecting the driving and driven members for transmitting torque from one to the other, a coupling member rigidly connected to the driving member, a second coupling member rigidly connected to the driven member, means connecting the two rigid coupling members for resisting relative movement between the members upon the transmission of a uniform torque, the said means being ineffective to prevent relative movement of the rigid coupling members upon a pulsation in the torque, and fluid-pressure means operable upon a relative movement of the rigid coupling members for damping the return movement of the rigid coupling members to their normal relative position.

3. In a power-transmission coupling, the combination of a driving member, a driven member, a torsionally flexible member connecting the driving member and the driven member for transmitting torque from one to the other, a coupling member rigidly connected to the driving member, a second coupling member rigidly connected to the driven member, means connecting the two rigid coupling members for resisting relative movement of said members upon the transmission of a uniform torque, the said means being ineffective to prevent relative movement of the rigid coupling members upon a pulsation in the torque, and means operable upon a relative movement of the rigid coupling members for damping the return movement of said members to their normal relative positions.

4. In a power-transmission coupling for shafts, the combination of a torsionally-flexible member for connecting the shaft sections, a coupling member rigidly secured to each shaft section, clamping means for holding the rigid coupling members in light frictional engagement so as to resist any relative rotational movement during the transmission of a uniform torque, the said clamping means being ineffective to prevent relative movement of the rigid coupling members upon a pulsation in the torque, means operated by a relative movement of the rigid coupling members for permitting fluid under pressure to supplement the holding action of the clamping means and to increase the frictional resistance between the two rigid coupling members, and means for slowly dissipating the fluid pressure, whereby the return movement of the rigid coupling members to their normal relative positions and the reflexive movement of the flexible member are damped.

5. In a power-transmitting coupling, the combination of a driving member, a driven member, a torsionally-flexible member for connecting the driving and driven members, a coupling member rigidly connected to the driving member, a second coupling member, rigidly connected to the driven member, a pair of flange members having opposed faces adapted to frictionally engage one another, means providing a longitudinally-slidable driving connection between each flange member and one of the rigid coupling members, and an inertia member carried by one of the flange members and operable upon a predetermined rate of change of velocity of the coupling member, to increase the degree of frictional engagement between the opposed faces of the flange members.

6. In a power-transmission coupling, the combination of a driving member, a driven member, a torsionally yieldable member connecting the driving and driven members and providing a flexible driving connection therebetween, cooperating frictional clutch elements connected to the driving and driven members, respectively, and means responsive to a predetermined rate of change of velocity of one of the two first-named members for effecting frictional engagement of the clutch elements so as to dampen relative torsional oscillations between the driving and driven members.

7. In a power-transmission coupling, the combination of a driving member, a driven member, a torsionally yieldable member connecting the driving and driven members and providing a flexible driving connection therebetween, cooperating frictional clutch elements connected to the driving and driven members, respectively, and means responsive to a predetermined rate of change of velocity of one of the two first-named members for effecting frictional engagement of the clutch elements so as to dampen relative torsional oscillations between the driving and driven members, and means providing for gradually releasing the frictional engagement of the clutch elements.

In testimony whereof, I have hereunto subscribed my name this nineteenth day of March, 1925.

IRA SHORT.